US007679779B2

(12) United States Patent
Pollard et al.

(10) Patent No.: US 7,679,779 B2
(45) Date of Patent: Mar. 16, 2010

(54) IMAGE PROCESSING

(75) Inventors: Stephen B. Pollard, Nr. Dursley (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 980 days.

(21) Appl. No.: 11/165,256

(22) Filed: Jun. 23, 2005

(65) Prior Publication Data
US 2005/0286763 A1 Dec. 29, 2005

(30) Foreign Application Priority Data
Jun. 24, 2004 (GB) ................. 0414186.7

(51) Int. Cl.
G06F 15/00 (2006.01)
G03F 3/08 (2006.01)
G06K 15/00 (2006.01)
G06K 9/00 (2006.01)

(52) U.S. Cl. ............... 358/1.9; 358/518; 358/3.27; 382/167

(58) Field of Classification Search ............... 358/1.9, 358/515, 518, 523, 530, 532, 537, 3.27, 1.13; 382/167, 164, 266–269
See application file for complete search history.

(56) References Cited

U.S. PATENT DOCUMENTS

| 5,012,329 | A |   | 4/1991 | Lang et al. | |
|---|---|---|---|---|---|
| 5,189,523 | A | * | 2/1993 | Sugiura et al. | 358/300 |
| 5,949,964 | A | * | 9/1999 | Clouthier et al. | 358/3.06 |
| 6,259,803 | B1 | * | 7/2001 | Wirtz et al. | 382/103 |
| 6,285,798 | B1 | * | 9/2001 | Lee | 382/260 |
| 6,317,522 | B1 | * | 11/2001 | Rackett | 382/268 |
| 6,741,751 | B1 | * | 5/2004 | Klassen | 382/266 |
| 6,757,442 | B1 | * | 6/2004 | Avinash | 382/274 |
| 6,956,967 | B2 | * | 10/2005 | Gindele et al. | 382/167 |
| 7,003,173 | B2 | * | 2/2006 | Deshpande | 382/261 |
| 7,079,687 | B2 | * | 7/2006 | Guleryuz | 382/180 |
| 7,167,186 | B2 | * | 1/2007 | Credelle et al. | 345/613 |
| 7,206,101 | B2 | * | 4/2007 | Avinash | 358/3.26 |
| 7,218,420 | B1 | * | 5/2007 | Tai et al. | 358/3.2 |
| 7,243,945 | B2 | * | 7/2007 | Breed et al. | 280/735 |
| 7,305,144 | B2 | * | 12/2007 | Fattal et al. | 382/274 |
| 7,379,626 | B2 | * | 5/2008 | Lachine et al. | 382/300 |
| 7,406,208 | B2 | * | 7/2008 | Chiang | 382/266 |
| 7,518,618 | B2 | * | 4/2009 | Loce et al. | 345/611 |
| 2003/0099406 | A1 | * | 5/2003 | Georgiev et al. | 382/268 |
| 2004/0165785 | A1 | * | 8/2004 | Monobe et al. | 382/268 |
| 2005/0135664 | A1 | * | 6/2005 | Kaufhold et al. | 382/131 |
| 2005/0207630 | A1 | * | 9/2005 | Chan et al. | 382/131 |
| 2006/0039590 | A1 | * | 2/2006 | Lachine et al. | 382/128 |

FOREIGN PATENT DOCUMENTS

| EP | 1128660 A2 | 8/2001 |
|---|---|---|
| EP | 1395041 A2 | 3/2004 |

OTHER PUBLICATIONS

Search Report dated Oct. 19, 2004.
Combined Search and Examination Report dated Oct. 20, 2004.

* cited by examiner

Primary Examiner—Madeleine A Nguyen

(57) ABSTRACT

A method of digitally processing data for use in representing an image, comprising scaling edge data relating to edges in at least one colour-adjusted component of the image using unadjusted data relating to a colour-unadjusted component of the image, and a device operable in accordance with the method.

19 Claims, 3 Drawing Sheets

IMAGE PROCESSING

TECHNICAL FIELD

The present invention relates to the field of image processing.

CLAIM TO PRIORITY

This application claims priority to copending United Kingdom utility application entitled, "IMAGE PROCESSING," having serial no. GB 0414186.7, filed Jun. 24, 2004, which is entirely incorporated herein by reference.

BACKGROUND

Colour correction of digital colour images is required in a number of image processing contexts.

One important environment is in digital imaging. It is known to produce colour sensors by introducing an alternating pattern of colour filters onto the array of individual sensor elements of a device. Alternatively, an image sensor may capture information relating to a plurality of different wavelengths of light at each point of the sensor.

It is, however, difficult to construct colour filters for such sensors which exactly match the spectral characteristics of our eyes or which exactly match the primary colours used in computers to represent or display images. For this reason it is necessary for the captured images to be processed to transform the sensed colours to the desired colour system.

These issues apply to other contexts in which colour correction is required, such as for images generated by imaging systems having three CCD sensors (one for each colour plane) for example, by flatbed colour scanners, or by other imaging systems in which the colour image is formed from sets of separate, registered images. Certain of these issues may apply to other contexts also such as printing, where colour correction is used to map from one colour space to that of the printer such as, for example, from a standard RGB (Red, Green, Blue additive primary) colour space to the RGB space of the printer (prior to the final transformation to the physical CMYK (Cyan, Magenta, Yellow, Black subtractive primary) colour space of the printer).

When processing an image in order to transform it from one colour space to another, it is desirable to avoid mixing noise from a noisy channel, such as the blue colour channel for example, into a less noisy channel, such as the green colour channel for example.

Co-pending United Kingdom Patent Application Number 0118456.3, incorporated herein by reference, discloses a method for the colour correction of images. An image to be processed is split into low and high frequency components and colour correction is applied to the low frequency component only. In this manner, the effect of noise is reduced during the colour correction process as the higher spatial frequency component of the image, which generally carries a larger proportion of the noise in an image, has no colour correction applied to it.

The process of GB0118456.3 is suitable for modest transforms within the same basic colour space such as RGB to RGB, but it does not work particularly well in more extreme situations such as when transforming from complementary colours such as CMY to the primary RGB colours, for example.

Both Japanese Patent Application No. 2003-110860 and "Suppression of Noise Amplification During Colour Correction", Kharitonenko et al., IEEE Transactions on Consumer Electronics, Vol. 48, No. 2, May 2002 (Published), pp. 229-233 describe processes for colour correction of images.

A further enhancement of GB0118456.3 is described in U.S. patent application Ser. No. 10/216,648. Therein, an adjustment may be applied to the high frequency image before recombining it with the colour corrected low frequency image in order to provide additional colour correction around areas of highly chromatic edges.

Despite this improvement and the fact that any high frequency image component processing only occurs around highly chromatic edges, noise is still introduced into the final transformed image. Furthermore, the method of Ser. No. 10/216,648 is limited in its ability to convert an image from one colour space into a different one and is only suitable for transformation between broadly similar colour spaces.

SUMMARY

According to a first exemplary embodiment, there is provided a method of digitally processing data for use in representing an image, comprising scaling edge data relating to edges in at least one colour-adjusted component of the image using unadjusted data relating to a colour-unadjusted component of the image.

According to a second embodiment, there is provided a method of digitally processing image data, comprising processing starting image data relating to a first colour space in order to generate first lower spatial frequency image data relating to the first colour space, processing the first lower spatial frequency image data in order to generate second lower spatial frequency image data relating to a second colour space, using the starting image data to generate first higher spatial frequency image data for one colour component relating to the first colour space, using the first and second lower spatial frequency image data respectively to generate first and second edge data relating to edges in the first and second lower spatial frequency image data for the respective colour spaces, using the first and second edge data for the respective colour spaces and said first higher spatial frequency image data to generate scaled higher spatial frequency image data relating to the second colour space, and using the scaled higher spatial frequency image data and said second lower frequency image data in order to generate output image data relating to the second colour space.

According to a third embodiment, there is provided an image processing device operable to process data for use in representing an image, the device being further operable to scale edge data relating to edges in at least one colour-adjusted component of the image using unadjusted data relating to a colour-unadjusted component of the image.

According to a fourth embodiment, there is provided an image processing device operable to, process starting image data relating to a first colour space in order to generate first lower spatial frequency image data relating to the first colour space, process the lower spatial frequency image data in order to generate second lower spatial frequency image data relating to a second colour space, use the starting image data to generate first higher spatial frequency image data for one colour component relating to the first colour space, use the first and second lower spatial frequency image data respectively to generate first and second edge data relating to edges in the first and second lower spatial frequency image data for the respective colour spaces, use the first and second edge data for the respective colour spaces and said first higher spatial frequency image data to generate scaled higher spatial frequency image data relating to the second colour space, and use the scaled higher spatial frequency image data and said second lower frequency image data in order to generate output image data relating to the second colour space.

BRIEF DESCRIPTION OF THE DRAWINGS

For a better understanding of the present invention, and to further highlight the ways in which it may be brought into effect, embodiments will now be described, by way of example only, with reference to the following drawings in which.

It should be emphasised that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
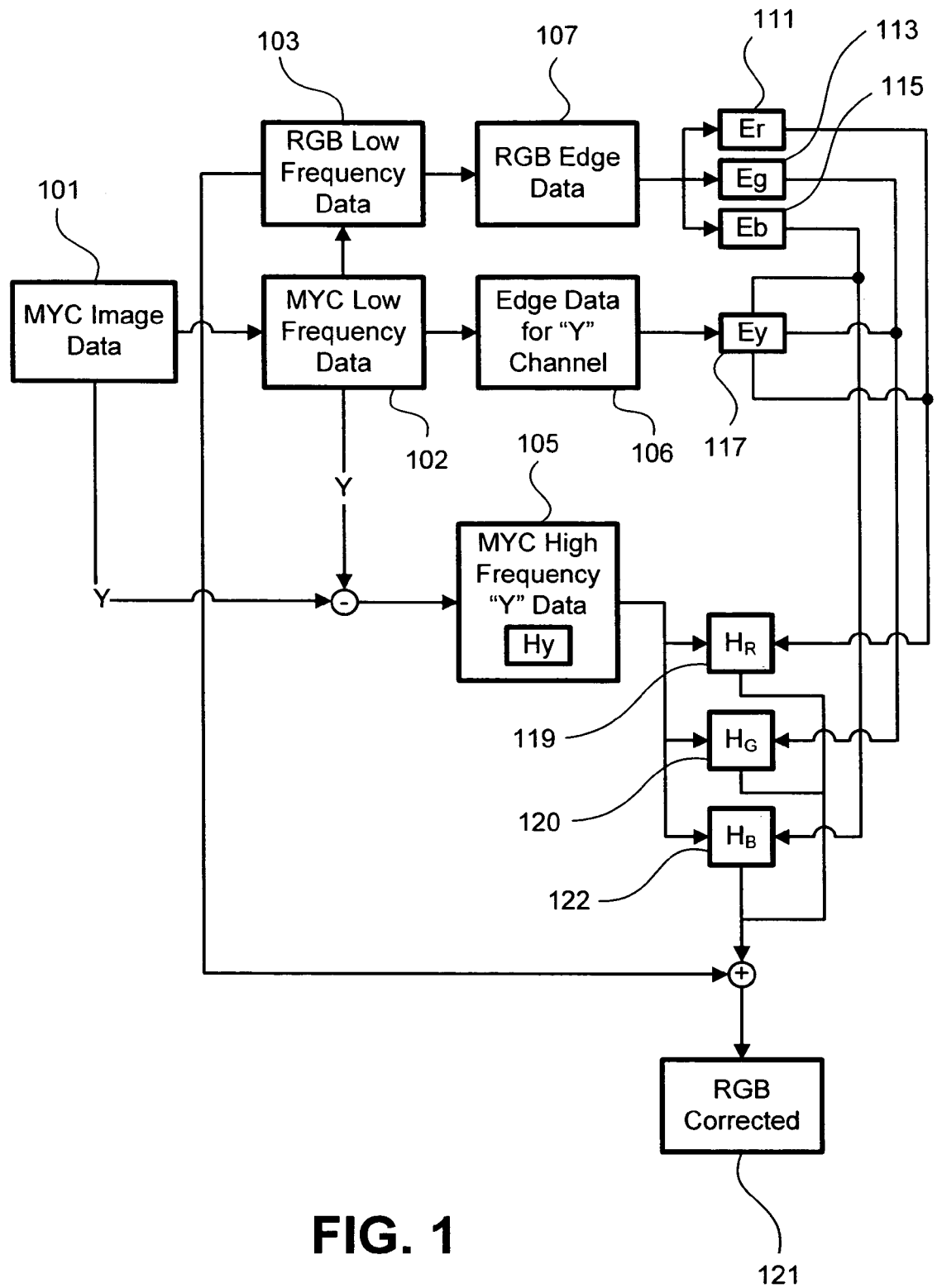
FIG. 1 is a control diagram relating to a method of obtaining colour adjusted image data.

Referring to FIG. 1, data representing a low frequency MYC image 102 is created from MYC starting image data 101 by use of an appropriate smoothing technique. The smoothing is effected, for example, by low pass filtering the data 101, or by any other suitable technique. A number of different techniques for smoothing are known as discussed in, for example, Gonzalez and Woods, "Digital Image Processing", pages 189 to 201, Addison & Wesley, 1992. Such techniques include use of finite response filters, infinite response filters and processing in the Fourier domain. In one embodiment, a two-dimensional Gaussian spatial filter is used in order to perform the filtering.

In creating the low frequency image data 102 each colour plane is treated separately. If there are three colour planes (the M, Y and C colour planes in this case), there will be in effect three low frequency images created. If there is not an intensity value for each pixel of interest in each colour plane, so that there will not be a low frequency image fully populated in each colour plane then an interpolation step or similar can be employed. Suitable interpolation is described in GB0118456.3 for example, and various other known techniques are applicable. If there is an intensity value for each pixel in each colour plane, the result of low pass filtering is data for representing the low pass image 102 at full resolution.

The low frequency data 102 is transformed to the RGB colour space using a suitable colour space transform in order to provide low frequency RGB data 103.

Higher frequency data 105 relating to a colour channel of the MYC image is obtained by performing a pixel-wise subtraction of the MYC raw image data and the MYC lower frequency data. The Y colour channel is chosen in this example to provide higher frequency data since an image will, in general, comprise more Y pixels than M or C pixels—generally, in a typical mosaiced pattern of MYC colour filters on an image sensor, there will be twice as many Y colour filters than M or C ones. Of course, the high frequency data 105 can relate to the M or C portions of the image data instead of the Y.

From the MYC and RGB colour space low frequency data 102, 103, edge data 106, 107 for the respective colour components of the low frequency images is determined in order to provide R, G, B and Y edge data images $E_R$, $E_G$, $E_B$ and $E_Y$ (111, 113, 115, 117), respectively. In a preferred embodiment, the edge data is determined using a gradient method by determining the magnitude of the local image gradient.

More specifically, in a preferred embodiment a two-dimensional (2D) first derivative operator is applied to each colour component of smoothed 2D image 102, 103 in order to highlight regions of the images with high value first spatial derivatives thereby giving rise to the image data components 111, 113, 115, 117 for the R, G, B and Y colour components of the images 102, 103, respectively.

More specifically, scaled RGB higher frequency image data 119, 120, 122 for the R, G and B colour channels respectively is then obtained using the higher frequency Y colour channel data 105, and the lower frequency edge data 111, 113, 115, 117.

Scaled RGB component higher frequency image data 119, 120, 122 is obtained according to the following formula:

$$H_i = H_Y \min\left(\frac{E_i}{E_Y}, 1\right)$$

where i=R, G or B, so that $H_R$, $H_G$ and $H_B$ are the scaled higher frequency components for the R, G and B channels, respectively. The 'min' operator determines the minimum of $E_i/E_Y$ and unity, and returns the minimum. This prevents the amplification of higher frequency components (and hence noise) from $H_Y$ into any of the constructed $H_R$, $H_G$ or $H_B$ higher frequency RGB image components 119, 120, 122.

The scaled higher frequency RGB data 119, 120, 122 is then combined with the RGB lower frequency data 103 via a simple pixel-wise addition in order to generate a final RGB corrected image 121.

Figure 2:
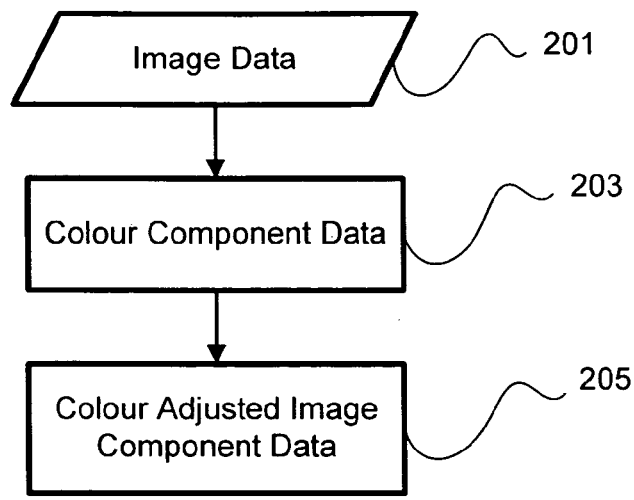
FIG. 2 is a flow diagram showing further detail of the method of FIG. 1.

FIG. 2 is a flow diagram relating to a method of processing data relating to an image. Image data 201 representing an image (not shown) is processed to provide data 203 relating to a colour un-adjusted colour component of the image. The data 203 is used to scale at least one colour-adjusted image component 205 of the image relating to edges in the image.

Figure 3:
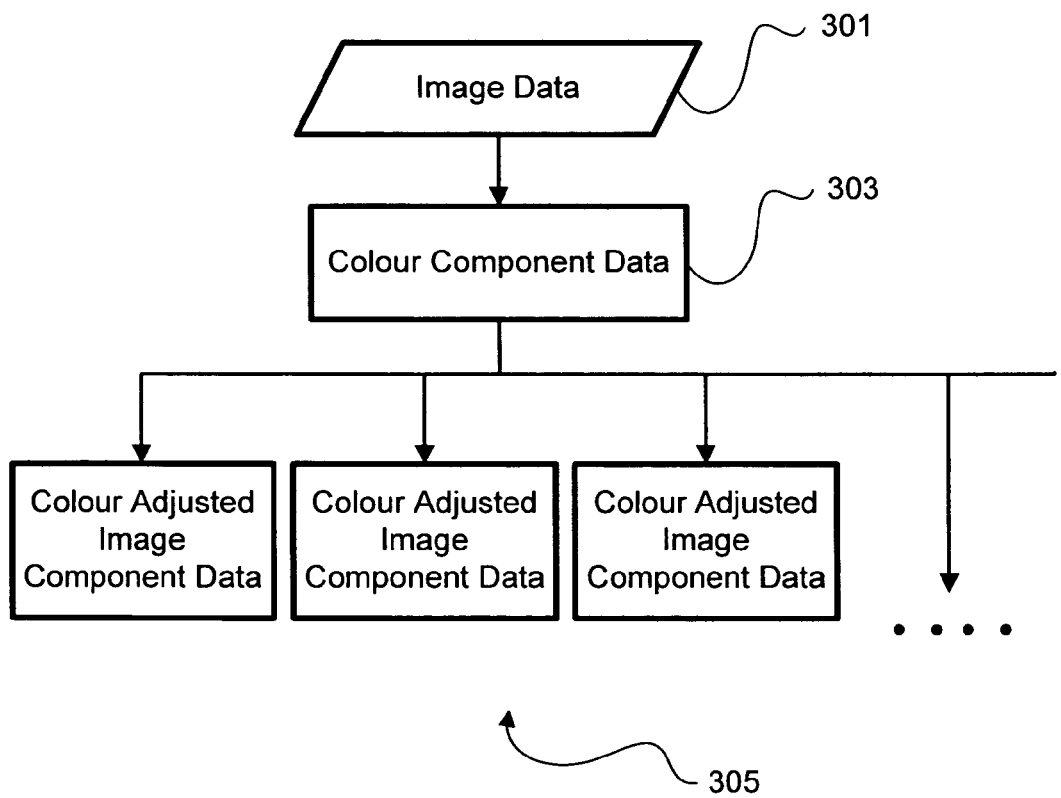
FIG. 3 is a further flow diagram showing further detail of the method of FIG. 1.

FIG. 3 is a further flow diagram relating to a method of processing an image.

Image data 301 representing an image (not shown) is processed to provide data 303 relating to a colour un-adjusted colour component of the image. The data 303 is used to scale a plurality of colour-adjusted image components 305 of the image relating to edges in the image.

Figure 4:
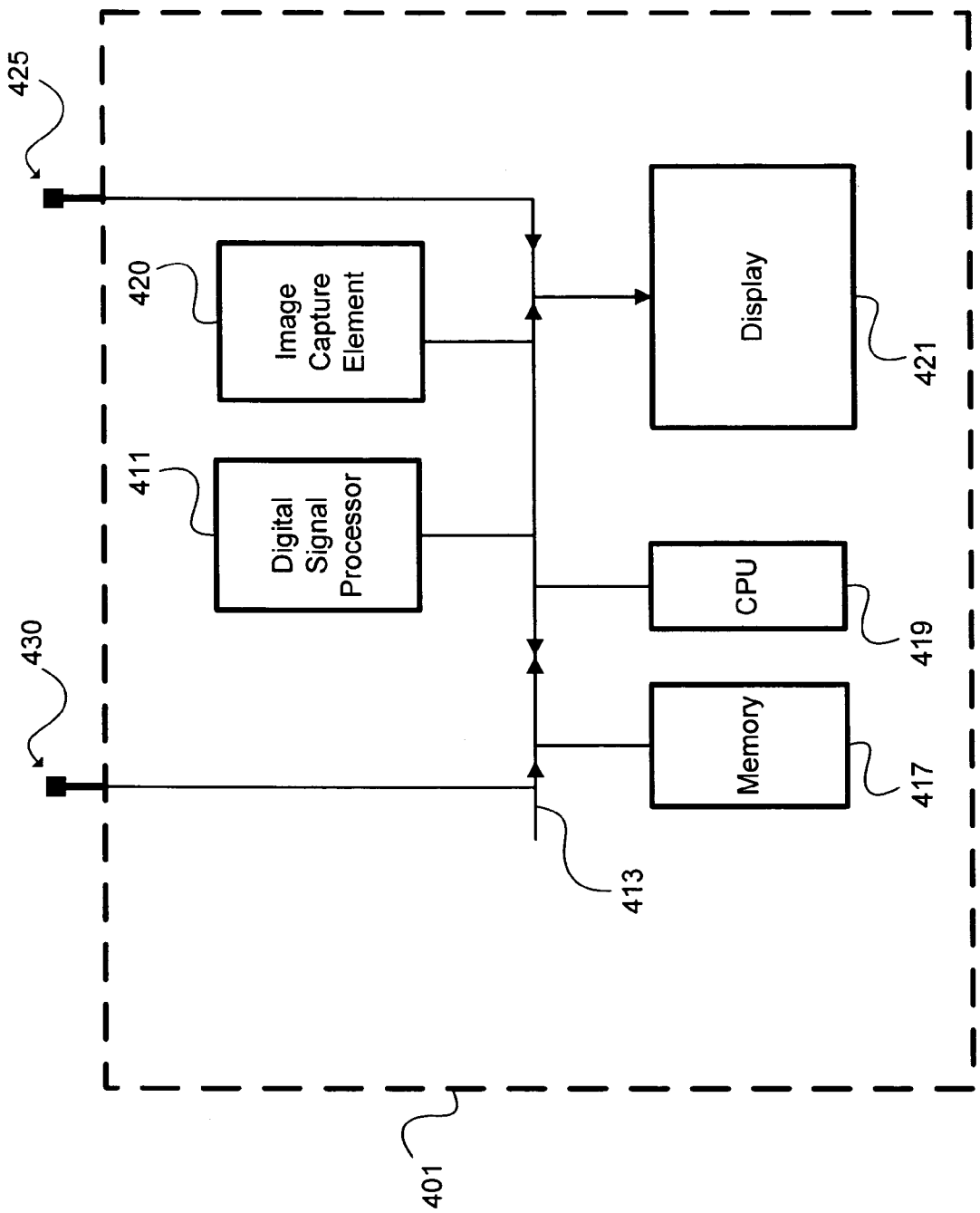
FIG. 4 is a schematic representation of an image processing device suitable for obtaining colour adjusted image data.

FIG. 4 is a schematic representation of an image processing device.

The device 401 comprises a digital signal processor 411, and receives data representing an image that can be processed by the digital signal processor (DSP) 411.

The data representing an image may be generated using an image capture element 420 of the device 401 such as a CCD or CMOS device for example, or may be received from a source external to the device 401 using the input port represented by 425.

A bus, or similar, 413 is operable to transmit data and/or control signals between the DSP 411, memory 417, central processing unit (CPU) 419, image capture element 420, display 421, and input port 425 of the device 401.

Memory 417 may be dynamic random-access memory (DRAM) and may include either non-volatile memory (e.g. flash, ROM, PROM, etc.) and/or removable memory (e.g. memory cards, disks, etc.). Memory 417 may be used to store image data as well as processed image data, and can also be used to store instructions operable to cause the CPU 419 and/or the DSP 411 to process image data.

Input device 425 can comprise a conventional input port operable to receive a physical entity such as a wire connection to a network using a cable (including Ethernet cable, RJ45 connectors or USB for example) or a memory card for example, or may be a device operable to receive data using a wireless connection such as Bluetooth or WiFi for example. Other alternatives are possible.

In use, a computer program comprising machine readable instructions suitable for implementing steps in the method as described above with reference to FIGS. 1 to 3 is loaded into the device memory 417. The instructions may be resident in a ROM area of memory 417 (not shown) and may, from there, either be loaded into RAM for execution by the CPU 419 and/or DSP 411 or executed directly by the CPU 419 and/or DSP 411 from ROM.

The instructions, when executed using the CPU 419 and/or DSP 411, are operable to digitally process data representing at least part of an image, which data has been generated using the image capture element 420, or received using the input device 425.

Processed data may be displayed using display 421 of the device 401, or may be output from the device 401 using output device 430, which can comprise a conventional output port operable to receive a physical entity such as a wire connection to a network using a cable (including Ethernet cable, RJ45 connectors or USB for example) or a memory card for example, or may be a device operable to transmit data using a wireless connection such as Bluetooth or WiFi for example. Other alternatives are possible.

The inclusion of the image capture element 420 is optional, and need not be present in the device 401.

The above exemplary method has been described with reference to transformation of image data from the MYC colour space to the RGB colour space. It will be appreciated that transformation to and from different colour spaces is possible. For example, data representing an image which relates to either of the RGB or sRGB colour spaces may be transformed to the sRGB or RGB colour spaces respectively, or to the MYC colour space. Other alternatives are possible.

The exemplary method has been described with reference to processing frequency components of an image to be transformed. The method need not be applied to frequency components of an image—other elements of an image to be transformed may be processed, and such processing may be applied to a set of image data as a whole, or to parts thereof, the whole or parts being pre-processed or raw image data.

The exemplary method described above is applicable to image processing devices such as mobile stations (including mobile telephones), personal digital assistants, mobile display devices and the like, which devices may or may not include image capture functionality (including an image capture element such as a CCD or CMOS device for example).

What is claimed is:

1. A method of digitally processing data for use in representing an image, comprising:
scaling strength of a plurality of edges in at least one colour-adjusted component of the image using unadjusted data relating to a colour-unadjusted component of the image, wherein the strength of each of the plurality of edges to be scaled is related to a gradient of the image.

2. A method as claimed in claim 1, wherein the unadjusted data relates to higher spatial frequency content of the colour-unadjusted component of the image.

3. A method as claimed in claim 1, wherein the unadjusted data relates to a first colour space, and said strength of the plurality of edges relates to a second colour space, wherein the first and second colour spaces each comprise any one of the RGB, sRGB or MYC colour spaces.

4. The method of claim 1, wherein the scaling is based on a ratio between the strength of the plurality of edges for the at least one color-adjusted component and the unuadjusted data corresponding to the color-unadjusted component.

5. The method of claim 4, wherein the scaling involves a scale factor, the scale factor comprising the unadjusted data.

6. The method of claim 4, wherein the scaling comprises applying a ceiling to the ratio and scaling the ceiling by the unadjusted data.

7. The method of claim 1, wherein the scaling is performed across the whole extent of the image.

8. The method of claim 1, wherein the strength of the edge is relative with respect to strength in a spatially-corresponding edge of the colour-unadjusted component of the image.

9. An image processing device operable to process data for use in representing an image, the device being further operable to:
scaling strength of a plurality of edges in at least one colour-adjusted component of the image using unadjusted data relating to a colour-unadjusted component of the image, wherein the strength of each of the plurality of edges to be scaled is related to a gradient of the image.

10. A device as claimed in claim 9, further comprising an image capture element operable to generate data representing the image in a first colour space.

11. A device as claimed in claim 10, wherein the first colour space is a MYC colour space, and the at least one colour adjusted image component is RGB colour space or sRGB colour space.

12. An image processing device operable to scale strength of a pluralitv of edges in at least one colour-adjusted component of the image using unadjusted data relating to a colour-unadjusted component of the image, wherein the strength of each of the plurality of edges to be scaled is related to a gradient of the image.

13. The image processing device of claim 12, wherein the scaling is performed across the whole extent of the image.

14. The image processing device of claim 12, wherein the strength of the edge is relative with respect to strength in a spatially-corresponding edge of the colour-unadjusted component of the image.

15. A computer program product comprising a computer readable medium having thereon computer program instructions, such that, when said program is loaded in a memory of the computer, said instructions cause the computer to process image data to scale strength of a plurality of edges in at least one colour-adjusted component of the image using unadjusted data relating to a colour-unadjusted component of the image, wherein the strength of each of the plurality of edges to be scaled is related to a gradient of the image.

16. The program of claim 15, wherein the scaling is performed across the whole extent of the image.

17. The program of claim 15, wherein the strength of the edge is relative with respect to strength in a spatially-corresponding edge of the colour-unadjusted component of the image.

18. A program stored on computer-readable medium, the program comprising instructions executable by a computer so as to cause the computer to process image data to scale strength of a plurality of edges in at least one colour-adjusted component of the image using unadjusted data relating to a colour-unadjusted component of the image, wherein the strength of each of the plurality of edges to be scaled is related to a gradient of the image.

19. A logic circuit configured to operate to scale strength of a plurality of edges in at least one colour-adjusted component of the image using unadjusted data relating to a colour-unadjusted component of the image, wherein the strength of each of the plurality of edges to be scaled is related to a gradient of the image.

* * * * *